United States Patent
Ryeczek

(10) Patent No.: US 6,646,206 B2
(45) Date of Patent: Nov. 11, 2003

(54) ELECTRICAL CABLE HAVING INDICATING MALFUNCTION MEANS THEREIN

(75) Inventor: John J. Ryeczek, Point Marion, PA (US)

(73) Assignee: Hazardguard, Inc., Point Marion, PA (US)

( * ) Notice: Subject to any disclaimer, the term of this patent is extended or adjusted under 35 U.S.C. 154(b) by 0 days.

(21) Appl. No.: 10/145,303

(22) Filed: May 13, 2002

(65) Prior Publication Data

US 2002/0170739 A1 Nov. 21, 2002

Related U.S. Application Data

(62) Division of application No. 09/318,096, filed on May 25, 1999, now Pat. No. 6,388,194, which is a division of application No. 08/312,650, filed on Sep. 27, 1994, now Pat. No. 5,922,996.

(51) Int. Cl.[7] .................................................. H01B 7/36
(52) U.S. Cl. ...................................................... 174/112
(58) Field of Search ............................. 174/112, 110 R, 174/120 R; 116/200, 207, 211, 216; 324/500, 541, 543

(56) References Cited

U.S. PATENT DOCUMENTS

| | | | | |
|---|---|---|---|---|
| 3,590,371 A | * | 6/1971 | Shaw, Jr. ..................... 324/505 |
| RE27,832 E | * | 12/1973 | Schoerner ................ 174/110 R |
| 4,344,909 A | * | 8/1982 | De Blauwe .................. 264/230 |
| 4,471,711 A | * | 9/1984 | Graham ........................ 116/216 |
| 5,152,611 A | * | 10/1992 | Pieper et al. ................ 374/160 |
| 5,225,109 A | * | 7/1993 | Feldhues et al. ............. 252/500 |
| 5,286,922 A | * | 2/1994 | Curtiss ......................... 174/112 |
| 5,401,908 A | * | 3/1995 | Rodeghero ................... 174/112 |
| 5,573,848 A | * | 11/1996 | Van Praet .................... 428/354 |

FOREIGN PATENT DOCUMENTS

JP          6-167531    *    6/1994

* cited by examiner

Primary Examiner—Chau N. Nguyen
(74) Attorney, Agent, or Firm—Sand & Sebolt

(57) ABSTRACT

Disclosed is an electrical cable assembly in simplest form including at least one conductor, at least one insulator, and at least one attention getting material and/or a visual reacting material such as a thermochromic material or liquid crystal formulation, which will, visually and/or physically react to certain critical temperature ranges. May give off a response to variations in temperature an/or magnetic and/or electrical fields which are indicative of a hazard and/or fault, or to the direct and/or indirect results of electrical energy behavior, to provide an indication of an electrical overload condition, and/or a malfunction, and/or the incremental stages of hazard experienced by, and being experienced by, and to be experienced by, the electrical cable assembly itself, which undergoes on its own, at least one noticeable manifestation, to get your attention.

24 Claims, 9 Drawing Sheets

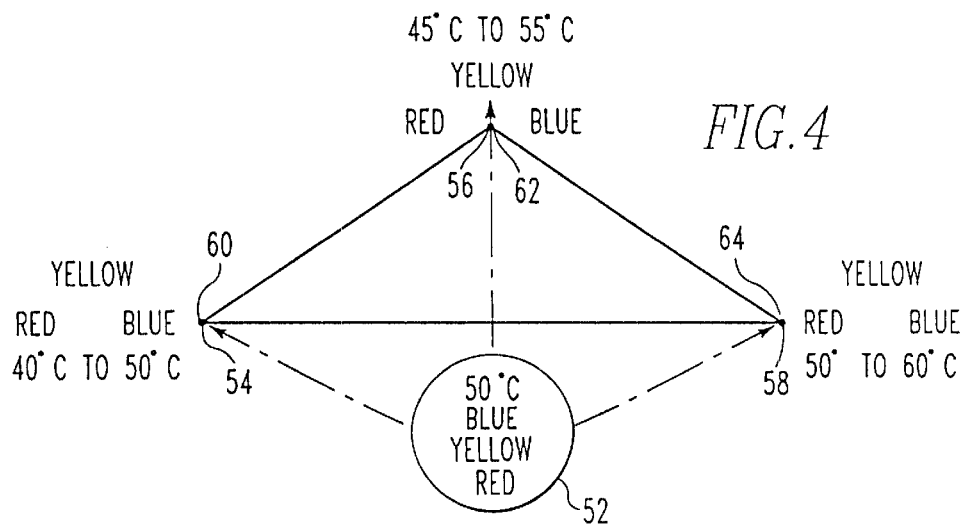
FIG.4
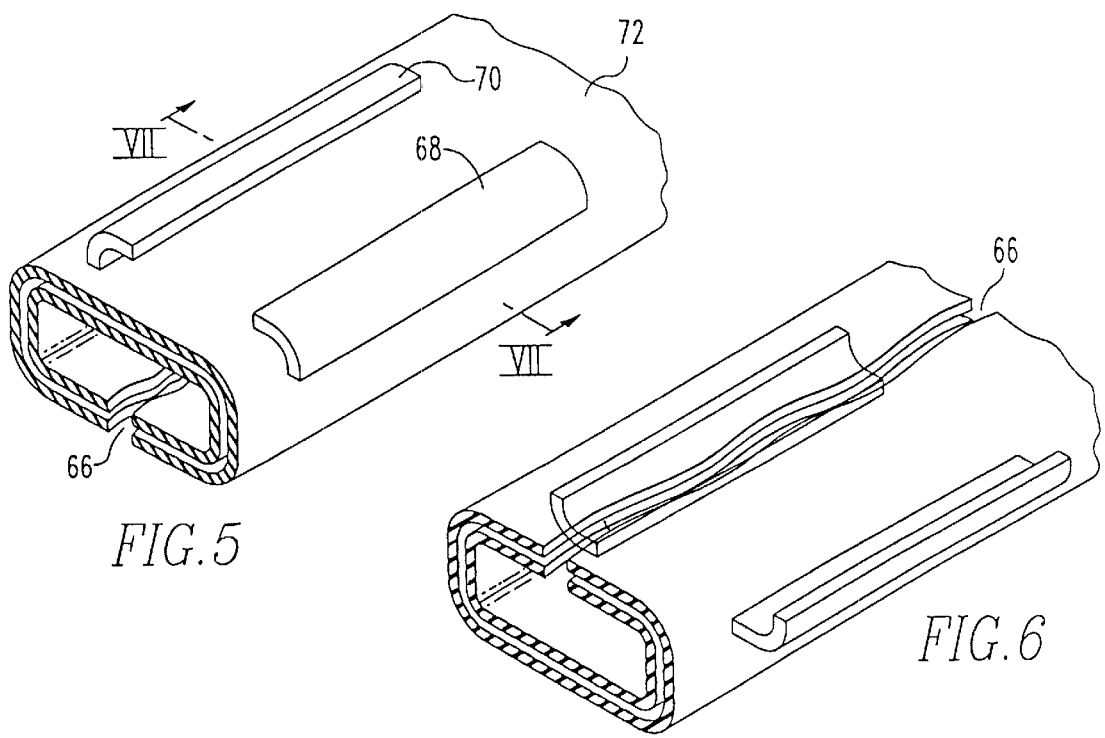
FIG.5
FIG.6
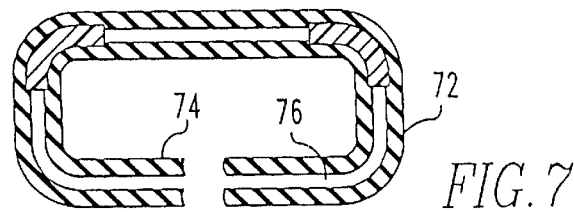
FIG.7

ELECTRICAL CABLE HAVING INDICATING MALFUNCTION MEANS THEREIN

This application is a division of application Ser. No. 09/318,096, filed May 25, 1999, now U.S. Pat. No. 6,388,194, issued May 14, 2002; which in turn is a division of application Ser. No. 08/312,650, filed Sep. 27, 1994, now U.S. Pat. No. 5,922,996, issued Jul. 13, 1999, the entire disclosures of which are incorporated herein by reference.

BACKGROUND OF THE INVENTION

1. Field of the Invention

The present invention relates to cables and conductors and, in particular, to insulation therefore.

2. Brief Description of the Prior Art

In alternating current or direct current electrical power transmission, electrical conduction processes in condensed matter, under certain conditions, consist of the transport of heat, electric charge, mass, and magnetism or some combination of the four in some possible response to an imposed temperature gradient, electric field, density gradient, or magnetic field. Electrical conductivities vary greatly between various materials, and conductivities may vary by an amount of 20 decades or more between metals and most commercially used insulating materials. In electrical cables a thermodynamic equilibrium is established between the particular materials used as the electrical insulation and the electrical conductors.

Influences on the conduction processes in insulation are known as traps, polarizability or treeing. Such influences contribute to what is known as electrical breakdown, either thermal or electronic. External cold temperature plays a part in insulation degradation (i.e., cracking) by what is known as cold bend or static temperature. An insulation or dielectric material can under certain conditions experience dielectric breakdown or may spark over when the insulation or dielectric strength drops either because of deterioration, impurities, moisture or physical abuse or damage by the user or abnormal electrical conditions. The existence of foreign materials in the insulation and also what is known as electrically stressed insulation, may under certain conditions result in dielectric break down resulting in heating and unwanted shorts. Some dielectric heating may also result from molecular friction from alternating current which may result in a dielectric loss and dielectric strength drops. Presently today's commercial insulation on an electrical cable assembly or wire hides electrical damage and does not have the capabilities to indicate and/or locate varied inner cable faults and/or malfunctions and/or damage and/or hazard. My invention show it and more.

Therefore, it is an object of the present invention to provide an electrical cable assembly that will indicate, through an attention getting means, preferably visually through sight or by smell or taste or touch, the presence of a fault and/or malfunction and/or damage and/or hazard in the electrical cable assembly. A further object of the present invention relates to a repair jacket and tape to be used in combination with an electrical cable assembly where in the repair jacket or tape also has the capability to indicate the presence of electrical repaired cable faults, and/or malfunction, and/or damage, and/or hazard by an attention getting means.

SUMMARY OF THE INVENTION

It is an object of this invention to provide a new jacket, sheath or insulation covering for electrical cables or a new electrical cable assembly with at least one attention getting stimulation means, which will be know as a reactee, having a noticeable awareness means, by giving off at least one response by a reacting material that may be at least one visual or color change that is temporary or permanent or in combination and/or testable and/or odoriferous and/or physically changeable that may extend or travel through some dimension of the cable that will:

detect an electrical overload condition of itself;

detect and/or locate the spot of internal electric sparks and arcs and/or a pre-shortening condition, and/or an intermittent malfunction;

detect and/or locate the spot where the beginning of an internal dielectric break down process is starting and/or taking place;

detect and/or locate the spot where internal dielectric break down is occurring and/or was occurring;

give information as to whether a particular circuit is on or off under the proper environmental and engineered conditions;

give an indication of an arc or spark and or dielectric break down and the conduction process occurring internally;

detect and/or locate its own internal electrical malfunction quickly without devices or electrical and electronic instruments, making itself capable of indicating its own condition or conditional level without reference to a normal function, and may automatically reset itself with no calibration needed;

allow inspectors to see dangerous cable and wires that should be taken out of service;

reduce the risk of fires, electrical shock and electrocution and thus make for a safer electrical distribution system;

warns of harsh environment temperature, example: cold bend, "WARNING—DO NOT BEND," so cable insulation does not crack when cable assembly is bent;

give a visual warning of the existence of critical temperature ranges or thermal ratings for electrical insulation as is set forth by the National Electric Code or a governing agency or a manufacturer's specifications:

to deter a child or pet from playing with (i.e, especially putting in the mouth);

provide any of the above mentioned functions so that a partially color blind persons can see critical points or critical temperatures and detect and/or locate electrical problems;

provide any of the above mentioned functions so a totally blind person can tell a critical point or critical temperature and detect and/or locate electrical problems;

provide any of the above mentioned functions so that the hearing impaired person can identify a critical point or critical temperature and detect and/or locate electrical problems;

provide any of the above mentioned functions if desired a better higher surface electrical resistance of ohmic values by spacing strategically the visually reacting formulation so a surface area of higher resistance surrounds the surface area of a lower resistance visually reacting formulation or by adding at least one additive;

provide any of the above mentioned functions with a displayable form of moving colors, or a color moving effect, and/or a readable language or alphanumerics.

This new electrical cable assembly, repair jacket and tape, alone or in combination, consist of an electrically insulating means which can be described as containing or coupled to a reacting material. The reacting material, a reactee, reacts while maintaining its insulating properties to various cable conditions. The reacting material can be coupled to an electrically extending electrovisual wire, cord or cable. A reactor is an internal and/or outer abnormal condition occurring within or on an electrical cable assembly and having noticeable results to the outside of the electrical cable assembly through the reacting material, the reactee. The preferred action of the electrically insulating means is an outer visually reacting reactee reacting to an internal reactor.

The term "reactive" or "reacting" as used herein will be understood to mean a change which will gain the attention on one via the sense of sight or touch. Examples include color changes or lettering or words which suddenly appear and become visible or physical deformations like swelling, blistering, shrinking and/or melting. Other sensory-like changes will include non-palatability when a material or composition is chewed or bitten into, (i.e., hot pepper extract, citric acid, etc.) or audio resulting from special materials that produce sounds when undergoing physical deformation, and/or smell, from releasing material composition (i.e., methyl nonylketone, oil base odor releasing gels, a sulfur base composition that may contain chlorides, etc.).

The term "electrical cable" as used herein will be understood to mean or comprise an electrical wire, cable or cord, electrically insulated wire conductor, an electrical cable assembly or anything used in the form of an extending or rope-like insulating and conducting medium for the transmission, distribution, conduction or retainment of electrical energy. The electrical cable may have at least one delivery system, for example, an insulated conducting path, which is used as a facilitator for the transmission, distribution, conduction or retainment of electrical energy. The electrical cable assemblies disclosed in this patent application may facilitate electrical energy of the alternating current, direct current, analog, or digital type. The electrical cable assemblies discussed in the patent application may also use the inventive features in this patent application separately or in some combination. The term "visually reactive material" or "visually reacting material" as used herein may be, but is not limited to, a liquid crystal material because of (i.e., electrorheological fluid, magnetorheological fluid, thermochromic polymer gels). Preferred liquid crystals derive from the thermotropic group, particularly: cholesteric and/or chiral nematic subgroups. They may have designer formulations so that they function via color change within a predetermined range. The term "visually reactive material" or "visually reacting material" may also include electrical or magnetic field sensitive compounds that can also display a color change due to variations in electrical or magnetic field sensitive compounds that can also display a color change due to variations in electrical or magnetic fields. Additionally, some chemical compounds exist in materials that produce deformations in themselves and the surfaces to which they are coupled when subjected to pressure variations (i.e., pressure variations stemming from variations in heat within an electrical cable assembly).

The term "visually reacting material" as used herein may be-a thermochromic liquid crystal material which may be selected from but not limited to one or more of the following: Methoxybenzylidenebutylaniline or terephthal-bis-p-butylanaline. Some preferred liquid crystal materials are commercially available from the company "Hallcrest" under trade names BN-g90 C5w, BCN-g100 C, BCN-g-30 C5w, BN-R88 F10w, BN-G98 F10W or BN-R98 F10W. "Visually reacting materials" of the type that visually indicate variations in electrical or magnetic fields may be-commercially available from the company "E. M. Science Co." under the trade name of Licrilite.

The term "visually reacting material" will also include thermochromic ink and/or die and/or paint compositions and/or a thermochromic polymer and/or a liquid crystal polymer. It is found that some visually reacting materials may be advantageously used in amounts from 0.05 to 5 grams per square foot. Attention getting materials or visual reactance may be in powered form.

The term "visually reacting material" will also include any other material that emits light or has a fluorescence property or changes in transparent, or in color in response to, changes in temperature or electrical activity. These materials may also exist in the form of slurries, inks, dyes, paint combinations or can be impressed/impregnated in any flexible or inflexible substance so that the material can be coupled in some manner to an electrical cable assembly, repair jacket and/or tape.

Some visually reacting materials may require a specific background or dropback of a certain color in order to properly contract the visually reacting material when it undergoes a color change. This background can be used to enhance, aid or manipulate the visual effect of the visually reacting material. The color of the background can be made from inks, paints, dyes or even the natural color of the cable or its insulation or the color stemming from their ordinary manufacturing processes.

Protective coverings, which may range from transparent to opaque, may be utilized to protect some types of visual reacting materials or reactees. The protective coverings may also have an electromagnetic frequency selectivity ability. They may also have some of the proprieties of filtering, absorbing or reflecting lightwaves so as to transform the reactions of the reactor or reactee in order to aid the reacting material's reactance to it. Protective coverings may also be designed for harsh environments or weatherproofing. This new electrical cable assembly, repair jacket and tape, alone or in combination, may also consist of this protective cover which can be described as containing or coupled to a reacting material, to be known as a reactee reacting to a reactor, while maintaining its protective properties.

The term "protective" will be understood to mean protection for visually reactive material from environmental harm. Some examples are the damaging effects of chemicals, solvents, oils, moisture, water, radiation, sun rays, insects and animals or weather conditions. Further, the electrical insulation of an electrical cable assembly, repair jacket or tape may contain insect, animal and/or child-protective or repulsive qualities (i.e., an unpalatable insulation composition, i.e. methyl nonylketone, hot pepper extract, citric acid, etc.).

Even a-protective cover may have visually reacting results or physical deformations by way of polymer liquid crystals or thermochromic impregnated rubber compound coatings or heat-shrinking polyester coatings that blister, bubble or peel on a cable subjected to a malfunction which causes a variation in the cable's temperature or electrical/magnetic field. The protective cover may also be heat retaining or heat reflective or heat conducting depending on desired results that my be-wanted from such protective coverings.

The term "transparent," as used herein as a property of a protective covering will be understood to mean clear, color-tinted or semitransparent or as understood in the art. The transparent protective covering may have openings used as vents and/or transparent protective coverings may be made of a porous material (i.e., osmotic polymer or a semipermeable membrane).

Another feature of the present invention is that the electric cable assembly may contain a bad tasting composition to prevent the cable from being chewed by rodents or other animals, which may act as a pet or child-proofing. In another extreme it may be designed to attract insects and rodents in order to trap or exterminate them.

The term "couple" will be understood to mean containing, or united with, any manufacturing process that makes (i.e., screening, layer, impregnate, film, paint, die, etc.) in order to join together various materials, structures, or layers of an electrical cable assembly, that has means for indicating all functions therein, in particularly the means.

The next three terms "damage", "fault", and "hazard" are mentioned together here not only because of their differences but because of their relative relationships with one another. The three terms "damage", "fault", and "hazard" as used herein will be understood to mean the following as described in the next three paragraphs.

The term "damage" as used herein will be understood to mean: any physical injury or harm suffered by an electrical cable assembly. This may include any abnormal material condition occurring, or that has occurred, or that may occur in, and/or on an electrical cable assembly, either to an insulation thereof (i.e., traps, polorizability, treeing, dielectric breakdown, thermo breakdown, etc.) and/or a conductor within the electric cable assembly (i.e., an open conductor, an intermittent conduction by conductor, an irregularity etc.).

The term "fault" as used herein will be understood to mean: any electrical conduction process, and/or electrical condition that is abnormal for an electrical cable assembly (i.e., shorts, ground, phase to phase, return to hot, overload, under voltage load resistance short, etc.).

The term "hazard" as used herein will be understood to mean: a risk of danger, because of an increment of deterioration to be and/or done, either by damage and/or fault to an electrical cable assembly. Thus a hazardous electrical cable assembly may have at least one damage resulting in at least one fault, and/or at least one fault resulting in at least one damage to an electrical cable assembly. Both damage and fault may, under certain conditions, give variation in temperature, and/or agenetic, and/or electrical fields. When the two results, fault nd damage feed one another, a serious situation develops that can get very dangerous, fires or electrocution and the likes will result especially when fuses or breakers do not work properly for whatever reason. Thus making my electrical insulated cable having means or manifestation abilities for indicating malfunction therein, an excellent warning means, detecting trouble, potential trouble, and/or location of, in and/or on an electrical cable assembly, by this new electrical cable assembly itself.

Therefore, I have invented a hazard and/or fault self-indicating electrical cable assembly, repair jacket and tape which may be used in conjunction with one another or alone. The electrical cable assembly may include electrical insulation surrounding electrical wires, wherein the insulation is covered by a layer of or impregnated with a reacting and/or visually reacting material. The layer of reacting material and/or the layer of visually reacting material or impregnated insulation may then be covered by a transparent protective cover and/or may be a protective cover with a means to path the release of responses of reactable materials, and protective cover may be reactive. In another embodiment, the electrical cable assembly and repair jacket may also have visually reacting material embedded in a groove that runs axially to the electrical cable assembly. Furthermore, the reacting and/or visually reacting material may be arranged on the outside of the electrical insulation in spaced repeating sets of locations and/or markings where a set is comprised of multiple locations and/or makings of reacting and/or visually reacting material. Each mark and/or location within a set would be capable of measuring a different magnitude of a hazard an/or fault and/or producing a different response to same magnitude of hazard and/or fault. Alternatively, each spaced repeating sets of markings can be spaced repeating sets of bands that encircle the cable assembly and give the appearance of motion. These locations and/or marks or bands may also be embedded into the transparent protective layer rather than layered atop the insulation. Reacting and/or visually reacting material may also be applied to the outer surface of the insulation in the form of descriptive words or alphanumerics so that these would communicate a hazard and/or fault to a user or observer in a special predetermined manner.

An embodiment of the hazard and/or fault self-indicating electrical cable repair jacket comprises a shell formed as a rectangular or tubular sleeve member where the shell is composed of an electrical insulation covered by a reacting and/or visually reacting material. The jacket may have a longitudinal split on one side to facilitate adapting it over and around an electrical cable, possibly for cable repair purposes, or electrical trouble shooting. Reacting and/or visually reacting material may be either layered on the outside or impregnated into the insulation and may be covered by a transparent protective cover like that of the cable assembly. In another embodiment, the electrical cable jacket may be a tubular sleeve-like member where the inner diameter of the jacket is larger than the outer diameter of an electrical cable so that a small gap is formed, possibly for fire-preventative purposes whereby the jacket acts as a flame conduit.

An embodiment of the fault-indicating electrical tape comprises a substrate with an adhesive backing-on one side and on the opposed side a reacting and/or visually reacting material which may be covered by a transparent protective cover like that of the cable assembly. Alternatively, the electrical tape may include electrical insulation on the opposed side whereby visually reacting material may be embedded into this insulation. This tape will be flexible, and may be stretchable.

BRIEF DESCRIPTION OF THE DRAWINGS

The electrical cable of the present invention is further described with reference to the attached drawings in which:

FIG. 4 is a schematic illustration of various aspects of the operation of the cable shown in FIG. 3;

FIG. 5 is a top perspective view of a cable jacket embodying still another form of the present invention;

FIG. 6 is a bottom perspective view of the cable jacket shown in FIG. 5;

FIG. 7 is a cross-sectional view through line VII—VII in FIG. 5;

DETAILED DESCRIPTION

Figure 1A:
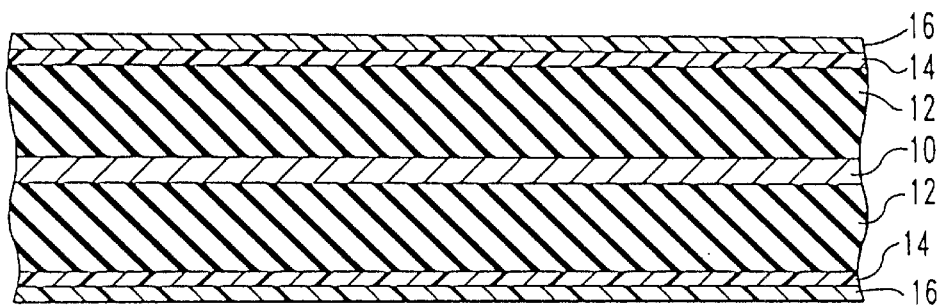
FIGS. 1a–c is a cross-sectional views of an electrical cable which is a preferred embodiment of the present invention.
Figure 1B:
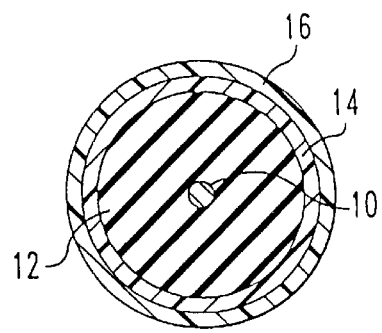
Figure 1C:
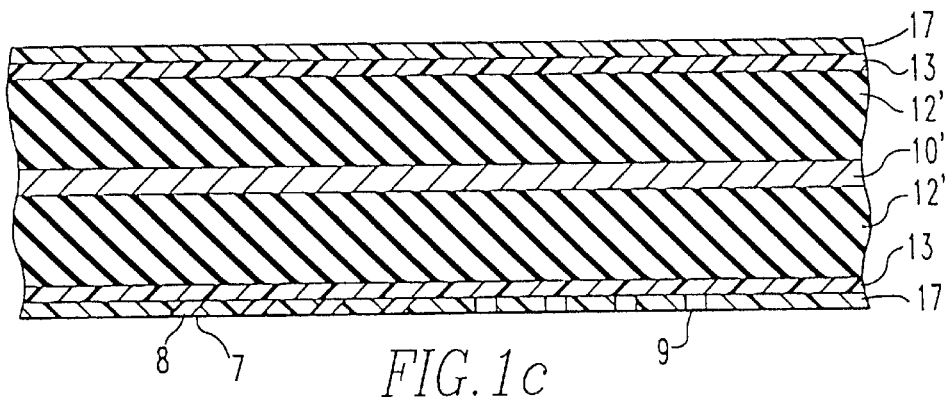

Referring to FIG. 1, this electrical cable assembly may include any features of FIGS. 1 through 17 including 17. In FIG. 1 this electrical cable assembly has a conductor 10 surrounded by an insulation 12. Now taken the steps of progression of which improves and makes a new cable assembly out of the old one, it would be to preferably have a background or colored dropback, exposed by the outer surrounding surface of insulation 12 which preferably would be a dark background, and if not, an artificial dropback may be needed to be added which would then cover at least a portion of this outerly insulation of 12. Insulation 12 is then surrounded by a layer of visually reacting material 14. The visually reacting material 14, may be a thermochromic material, a luminescence material, a liquid crystal material a odor-releasing material, or a taste-releasing material either used separately or in some combination. The thermochromic materials of it may include thermochromic ink, die, paint, etc. The liquid crystals at 14 may include liquid crystals polymers, or thermochromic liquid crystals, or thermochromic polymers. That layer of visually reacting material or reactee having its special purpose is covered by a transparent protective cover 16. The transparent protective covering 16 may also be made of a cellophane, a clear polymer, a clear polyester, an osmotic polymer, a semipermeable membrane and the transparent protective cover may even have thermochromic properties. The osmotic polymers or semipermeable membrane covers of 16 are means in which to release the responses from reacting material of 14 and 17. Any break in the conductor would cause the visually reacting material to glow or can become fluorescent or change colors in the vicinity of that break thereby indicating the location of the break and the facilitation of its repair, the reactor being or being started by electrical energy internally. Referring to FIGS. 1a –1b also, the number 16 may be a physical deformation material, and the number 14 may be a fragrance or odor releasing material. In this alternate type of assembly both 16 and 14 are reactees having their own special purpose, reacting to an internal and/or external reactor. Referring to FIGS. 1a –1b also, the number 16 may be an easy deformable material protective covering, and the number 14 may be a bad or very repulsive tasting material, in this alternate type of assembly only 14 would be a reactee having its own special purpose, reacting to an outer reactor. Referring to FIGS. 1a –1b, also, the number 16 may be a physical shrinking material and/or number 12 may be a physical swelling material while number 14 may be a pressure sensitive material producing a visual change or fluorescence when 16 and/or 12 is activated.

Referring to FIGS. 1a –1b also, the number 16 may be an opaque deformable material protective covering, and the number 14 may be a luminescence phosphorescence and/or fluorescence material that would be covering number 12 the insulation of an electrical cable assembly. Also, the protective transparent cover 16 is a means to release visual responses of visually reactive material 14, and the protective transparent cover may be thermochromic.

Also referring to FIG. 1 an alternate cable assembly may consist of number 13 being a odoriferous releasing material or 13 may be a tasteable material or 13 may be a combination of both odor releasing and bad tasting materials with a protective cover 17 that has openings or vents at 9 in which 9 makes a means to path the release of said material responses. The openings or vents may be on an angle 8, making a closeable flap 7, so the material of 13 does not get on anything when cable is being handled. The protective cover 17 may have pores represented by number 8 and 9, the protective cover 17 may also be a transparent protective covering. Also the said materials at numbers 13 and/or 14 may be classified as reactable or reacting materials having an attention getting and/or awareness means, which makes an excellent electric cable assembly for handicap people that may be blind or hearing impaired. The materials of numbers 13 and/or 14 may be used also as a pet or child proofing electric cable assembly, as well as a handicap cable, because they will be notified by an announcement from this kind of electrical cable assembly that something is wrong, or something is being done wrong. The vapors or gas of an odoriferous (odor and/or fragrance) material number 13 may be activatable by the internal heat from a malfunction occurring within the electrical cable assembly and may travel through pores 8 and/or 9 or alternate porous semipermeable membrane or osmotic polymer covering number 16, also number 17 may open and close pores and/or vents 9 and/or 8 by thermo expansion and contraction the thermo energy coming from internally of cable assembly.

Figure 15:
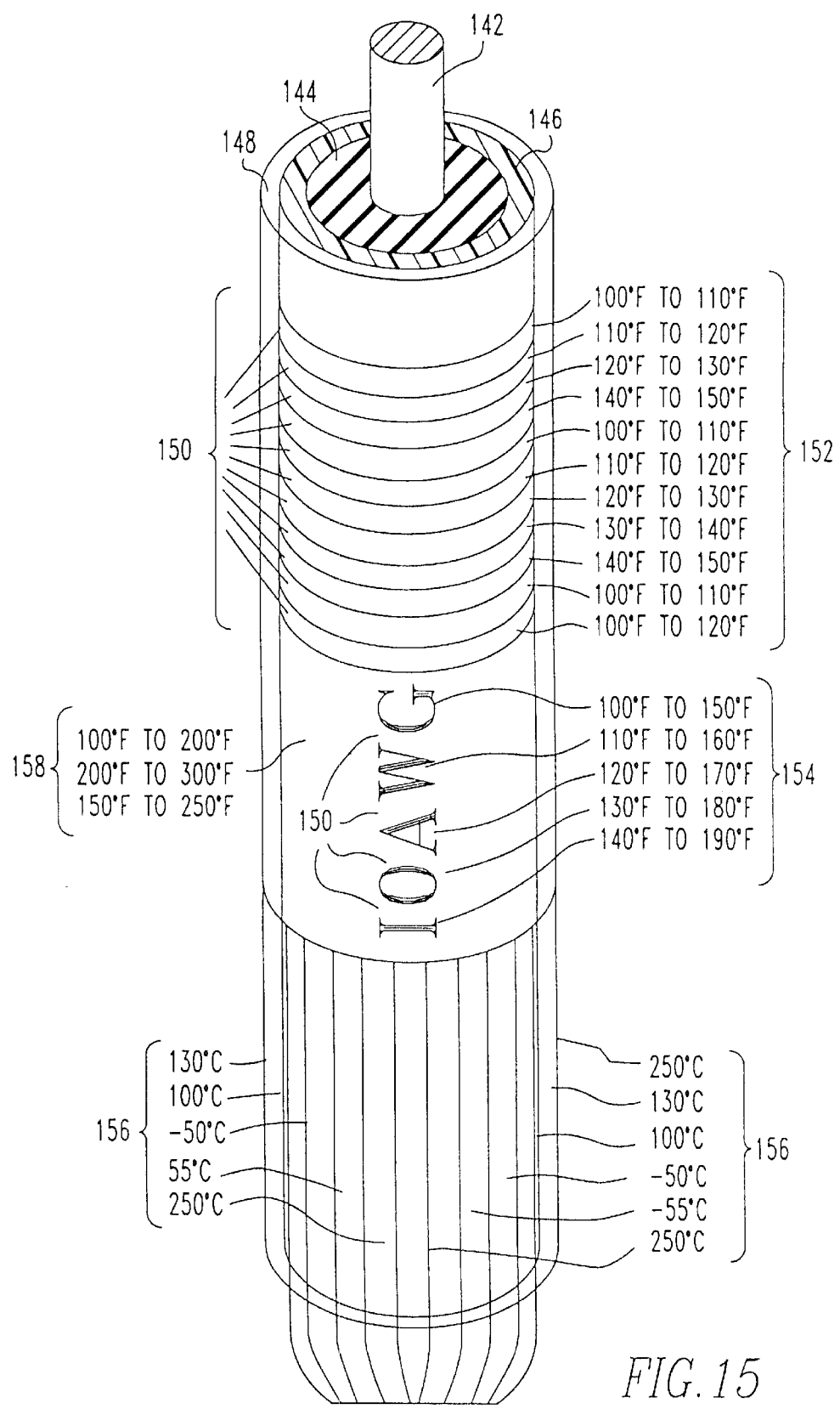
FIG. 15 is a cross-sectional perspective view of an electrical wire or cable.

Also referring to FIG. 1, it should be mentioned that the visually reacting or an attention getting material of 14 completely surrounds the conductor 10, so even if conductor 10 or insulation 12 was not circular there would still be a viewing range of at least 360 geometric degrees as in FIG. 15 at number 146 of the reacting materials in FIG. 1 number 14.

Figure 2:
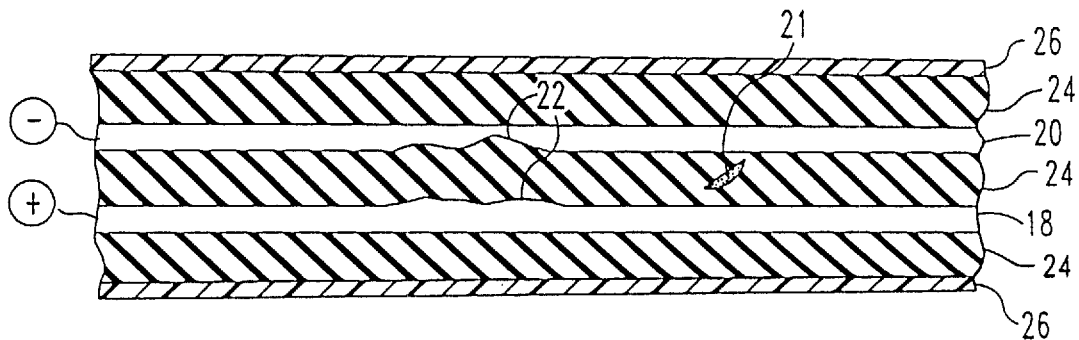
FIG. 2 is a cross-sectional view of an electrical cable embodying an alternate form of the present invention and including a detectable irregularity and/or an impurity.

Referring to FIG. 2, this electrical cable assembly may include any features of FIGS. 1 through 17 including 17. In FIG. 2 the electrical cable assembly includes two lengths of electrical conductors 18 and 20 and in both conductor 18 and 20 here is an irregularity 22 and in the insulation 24 there is a impurity 21, detectable under certain conditions by the cable's electrical insulation 24 which is impregnated with a visually reacting material, and may have an optional protective transparent covering 26. In this type of alternate cable assembly the reactee is in the cable's insulation.

Figure 3:
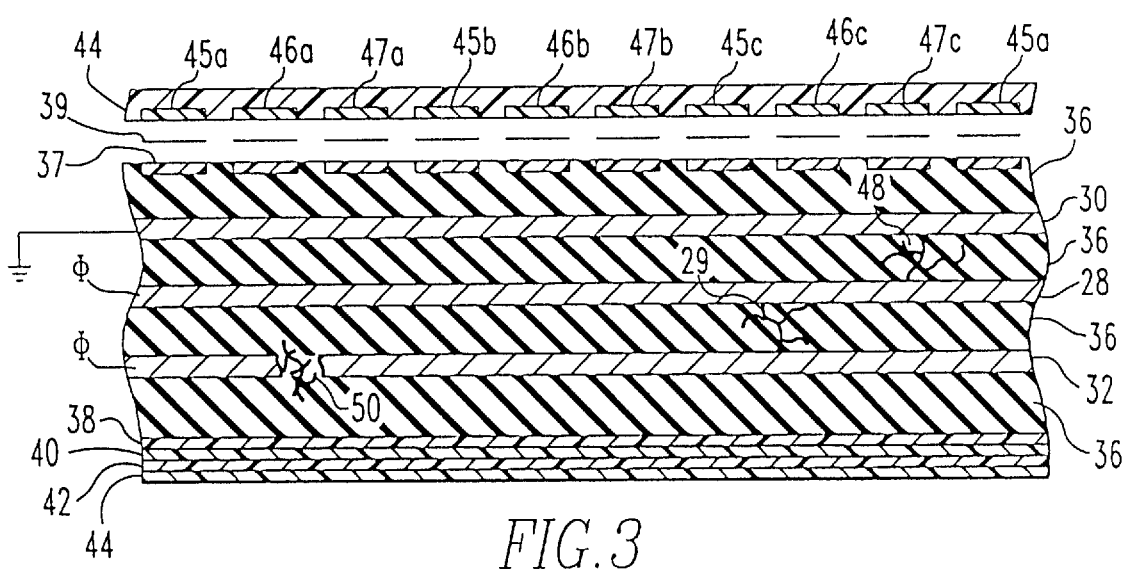
FIG. 3 is a cross-sectional view of an electrical cable embodying still another form of the present invention and in which several detectable malfunctions are also illustrated.

Referring to FIG. 3, this electrical cable assembly may include any features of FIGS. 1 through 17 including 17. In FIG. 3 the electrical cable assembly includes conductors 28, 30 and 32 along with insulation 36. Layers of visually reacting and/or reactive material which react at different temperature ranges or some physical component of electrical energy either directly or indirectly and upon their activation appear in different colors at same critical condition are shown at 38, 40 an 42. The entire cable is covered by an optional transparent protective cover 44. Another assembly method is to consecutively have embedded in this protective cover 44—starting at 45A or either embedded into cable insulation 36 starting at 37; or layered in consecutive sections at 39 between an optional protective transparent cover 44, and an optional outer dropback of outer cable insulation 36; layered sections or pockets of the first type of visually reacting or reactive material at 45A, 45B and 45C. The second type of visually reacting or reactive material is housed in or layered at pockets at 46A, 46B and 46C. The third type of visually reacting or reactive material are at the layers or pockets at 47A, 47B and 47C. Some malfunctions in the cable as would cause visual or physical reaction in the visually reacting or reactive material are shown, for example, in the conductor 28 at numeral 29 dielectric breakdown is in the insulation 36, at numeral 48 shorting is in the insulation 36, at numeral 50 is in the conductor 32 making a load condition. Also referring to FIG. 3 a luminescence material, fluorescence and/or phosphorescence may coat an electrical cable assembly at 38, then it may be coated with a clear substrate or covering at number 40, so as to coat substrate or covering 40 with a thermochromic material at 42 which is dark or opaque at normal electrical and/or insulating conditions and then has transparency to abnormal electrical and/or insulating conditions which is protected with a protective cover 44.

Referring to FIG. 4, principles of which may be used in any FIGS. of 1 through 17 including 17. In FIG. 4 there is shown a diagram in which various colors are visible at same temperature in the cable shown in FIG. 3. At the point shown at numeral 52 colors are blue, yellow and red at 50 degrees C. At the point shown at 54 colors are red to yellow to blue at 40 degrees C. to 50 degrees C. At numeral 56 colors are red to yellow to blue at 45 degrees C. to 55 degrees C. At point 58 colors are red to yellow to blue at 50 degrees C. to 60 degrees C. Point 60 coincides with 54, point 62 coincides with 56 and point 64 coincides with 58. This chart indicates that if the critical temperature of an electrical cable assembly is, for example, 50 degrees C. then a color can be seen by a partially color blind person at numeral 52. At 50 degrees C. three colors would be visible at once, they are in one spot, or each color may neighbor each other at same general location of an electrical cable assembly. Each different color at numeral 52 comes from each different reacting range of numeral 54, 56, and 58. A partially color blind person may only see one, or possible two of these colors, but they would see at least one.

Referring to FIGS. 5 through 7, there is shown a jacket that may have any features of FIGS. 1 through 17 including 17. In FIGS. 5 through 7 the jacket is to be used to retrofit an existing electrical cable assembly with the features of this invention. The cover has a split 66, pockets or locations of thermal liquid crystal or visual reactive material 68 and 70, and clear protective heat reflective cover 72. There is an electric insulating and heat conducting jacket 74, and the space 76 between this jacket cover 74, and the clear protective cover 72, may have a heat absorbing sealing material or be vulcanized together sealing the space 76. The entire or part of this structure may also have mechanical memory, clipping onto or off of a cable, being reusable.

Figure 8:
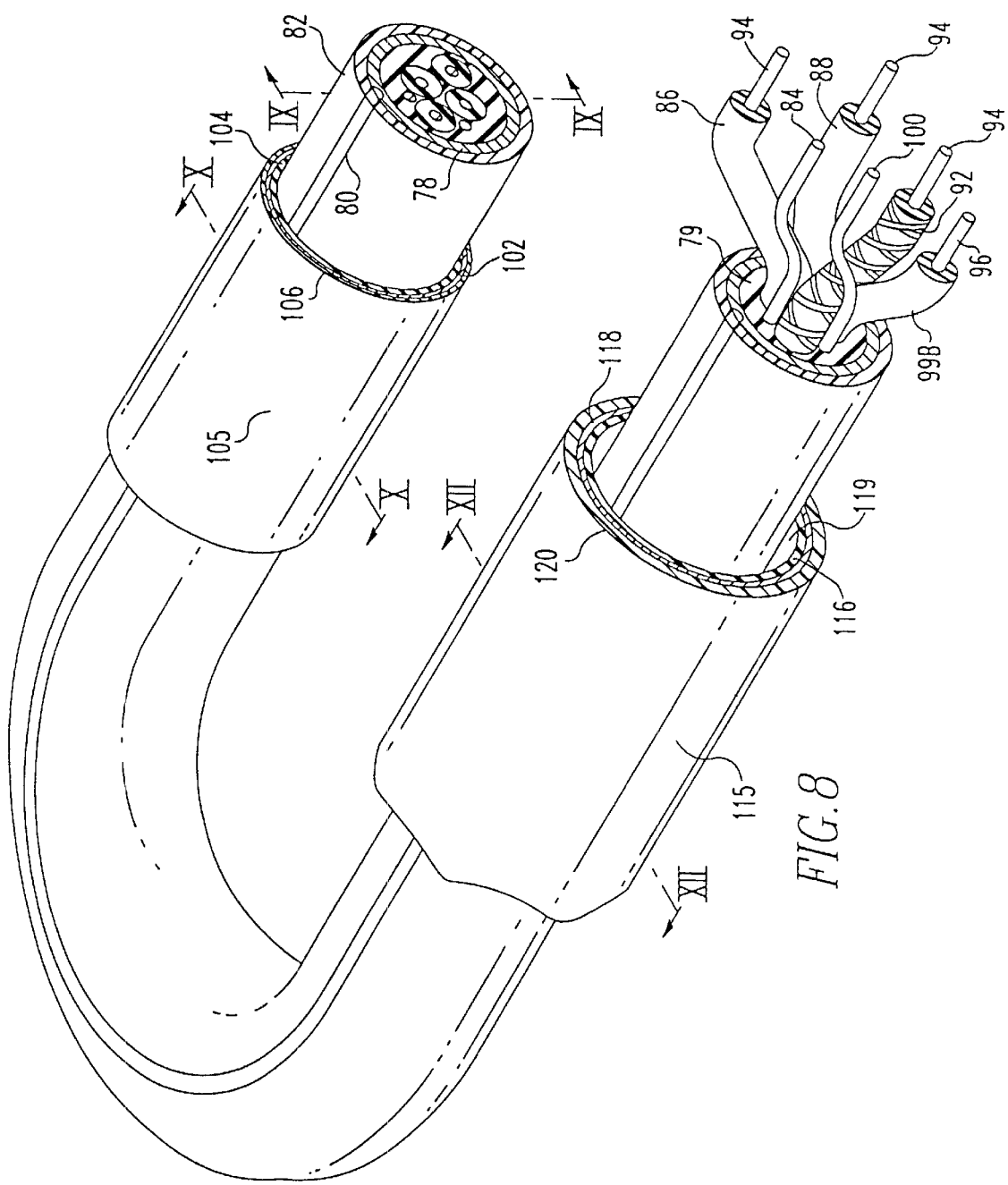
FIG. 8 is a cut-away perspective view of an electrical cable showing still another embodiment of the present invention.
Figure 9:
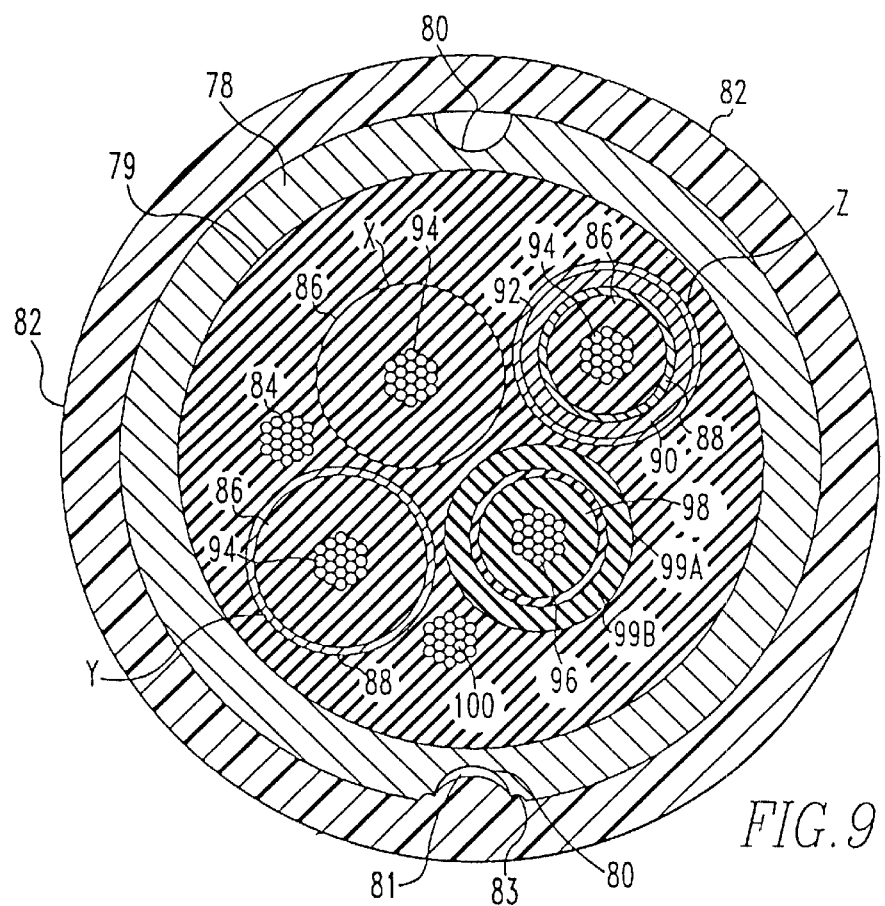
FIG. 9 is a cross-sectional view through line IX—IX in FIG. 8.

Referring to FIGS. 8 and 9, another electrical cable assembly that may include any features of FIGS. 1 through 17 including 17. In FIGS. 8 and 9 another electric cable assembly with a variety of inner cable assemblies having same purpose is shown. FIGS. 8 and 9 have a cable jacket 78 and at least one abrasive resistance groove and/or refillable groove 80 containing the visually reacting and/or attention getting and/or protective material 83 which is overlaid by an optional transparent layer of protective coating 82 which may also be abrasive resistant at 81 by being inside of groove or indentation 80, and still covering the visually reacting material 83 making a viewing lens also. This electrical cable assembly also includes at least one cable getting gatherer or string cable strengthener or cable filler or cable separator indicated by number 84 which may be comprised of thermochromic: paper, textile fabric or rubber. Also included may be an inner cable assembly of thermochromic impregnated insulation 86 at X and/or liquid crystal 88 at Y over which there is a, not necessarily, clear protective coating 90 because of being in an insulating housing 79 or having an outer jacket 78. Alternately at Z 86 may be a conventional insulation with a simple coating of liquid crystals 88. A clear protective covering 90, also includes an optional braided metal shielding 92 which may alternatively be a cloth cover having at least one thermochromic thread interwoven, also there is a stranded electric wire cable or power conductor lead 94 at X, Y and Z. This electric cable assembly of FIG. 9 also has a pilot conductor lead 96, either having a liquid crystal covering 99A, and optional clear cover 99B, surrounding a conventional insulation 98, that could be alternately a thermochromically impregnated insulation 98, thus eliminating 99a and still optional transparent protective cover 99b. A ground wire is at numeral 100. All of the internal parts for this cable assembly's construction may exist in it's own insulation housing 79. All internal insulation parts for this cable construction or cable assembly are best made of a permanently changing visually reacting material unless its' insulating housing 79 and its' outer jacket 78 are clear and can be seen through, then temporary changing visually reacting material could be used. Alternately, the insulating housing 79 could be thermochromic having a clear jacket 78 without 82 and 80. Another alternative would be to have the insulating housing 79 layered with or already having an optional dropback and then layered with liquid crystals as at number 78 without 80, if the outer jacket 82 is clear and can be seen through. All inner electric cables comprising the electrical cable assemblies of FIGS. 8 and 9 and even other Figures in this patent may be color coded as known in the art, for the distinguishment of separate phases or internal individual circuits, markings of coded colors may alternately be used. Also referring to FIGS. 8 and 9 number 78 may be an odor releasing material that could be combined with a bitter tasting material. Also, referring to FIG. 8, conductor 94 is surrounded by a heat shrinkable material 86, thus making another alternate electric cable assembly activatable upon predetermined conditions. Or to be used in other said electrical cable structures at this patent application, an example is to have number 82 have heat shrinkable qualities to a predetermined hazard.

Figure 10:
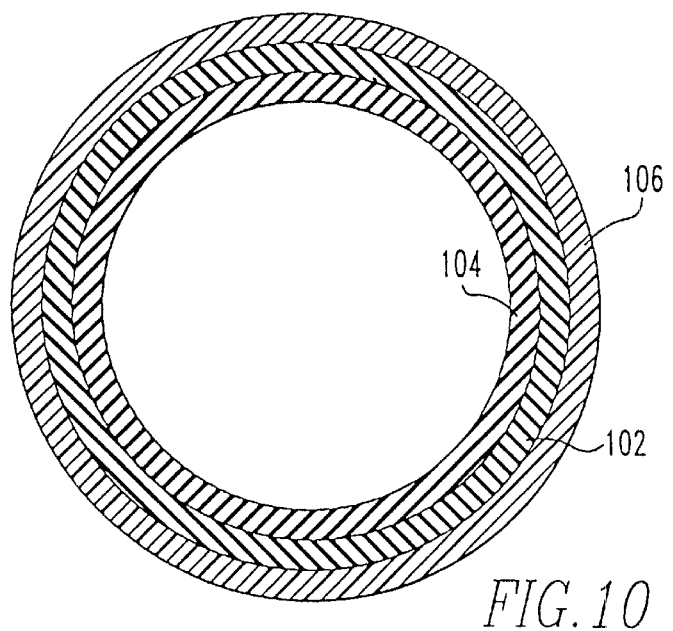
FIG. 10 is a cross-sectional view through line X—X of FIG. 8 of a repair boot embodying the present invention which may be used, for an example, on the cable shown in FIG. 8, or outer electric cable assemblies.

Referring to FIG. 10, there is shown a section view of a repair kit or boot that may include any features of FIGS. 1 through 17 including 17. In FIG. 8 said repair kit or boot 105 is on the cable assemblies of FIG. 8 through lines X that are in need of a waterproof electrical repair in which includes thermochromic material 102 impregnated into principal elastic electric insulation 104 and an optional elastic protective transparent cover 106. Alternately, 102 may be visually reacting and/or reacting material layered on a form fitting elastic principal electrical insulation 104 with a form fitting elastic protective transparent cover 106. This repair boot may also have at least one abrasive resistant groove or indention as in FIGS. 8 and 9 at numbers 80, 81 and 83.

Figure 11:
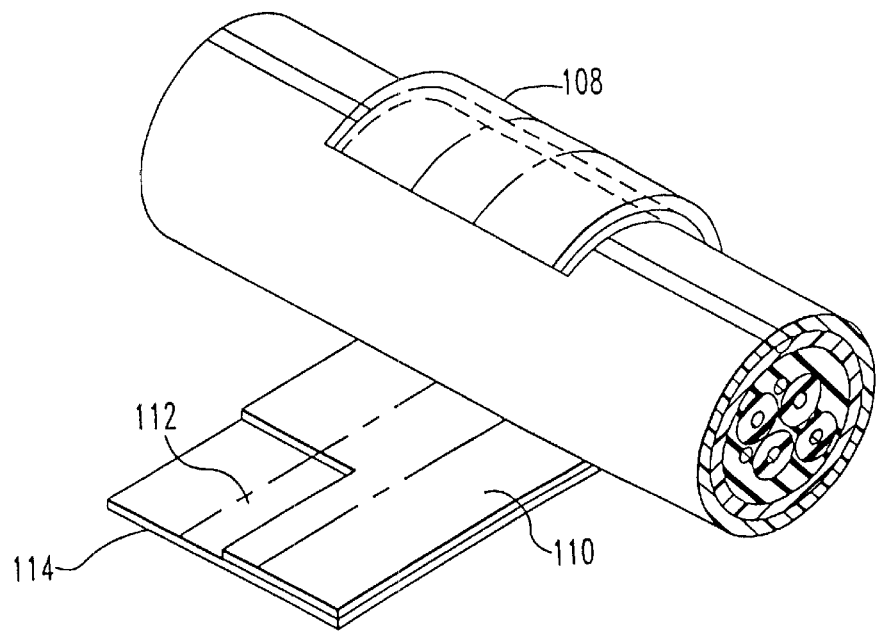
FIG. 11 is a cross-sectional perspective view of a roll of repair tape which may be used, for example, in or on an electric cable assembly.

In FIG. 11 there is shown tape that may include any features of FIGS. 1 through 17 including 17. In FIG. 11 there is shown tape for modifying or repairing an existing electrical cable assembly with or without the features of the present invention in which the tape is at numeral 108 which has adhesive backing 110 which may be a self-vulcanization or vulcanizing material at 110 which makes a sticking contact means and in which a layered or impregnated visual reacting and/or reacting material 112 which is in or on the transparent protective cover 114. Also referring to FIG. 11, 114 may be a thermally rated thermochromic impregnated electric insulation strip or tape having an adhesive backing 110, comprising the tape at numeral 108. In both references this tape may function with the features at this present invention. Also referring to FIG. 11, a heat shrinkable tape 108 with an adhesive side 110 and markings or means to indicate an amount of shrinkage or overload or hazard at 112.

Figure 12:
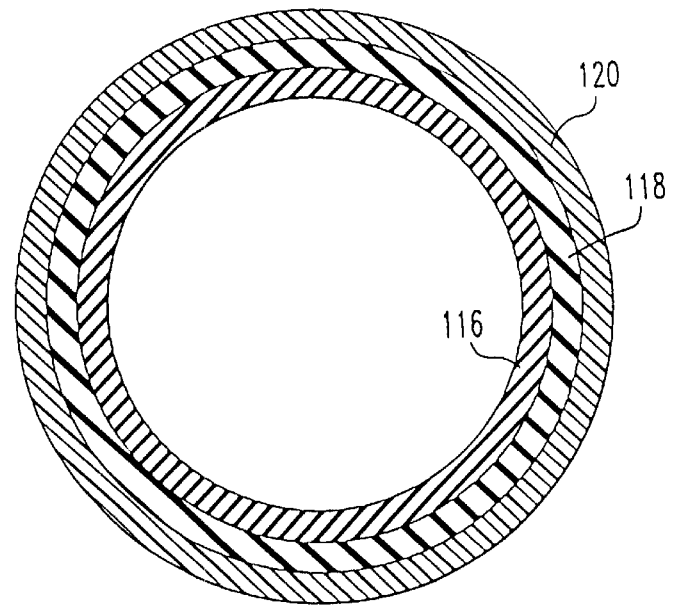
FIG. 12 is a cross-sectional view through line XII—XII of FIG. 8 of an electrical conduit which may be used, for an example, to house, guide flame path, or give extra mechanical abrasive protection to original cable shown in FIG. 8, or inner electric cable assemblies.

Referring to FIG. 12, a section view of electric conduit that may have any other features of FIGS. 1 through 17 including 17. In FIG. 12 a section view of electric conduit 115 of FIG. 8 through lines XII, it 115 includes main insulation having flexible flame path shown in FIG. 8 at number 119, also it 115 can be made of, fire or chemical proof electric insulation that can be a metal rigid structure 116, a visually reacting material and/or reacting 118 that can be layered on/or impregnated into 116 and an optional transparent protective cover 120. This electric conduit may also have at least one abrasive resistant groove or indention as in FIGS. 8 and 9 at numbers 80, 81 and 83.

Figure 13:
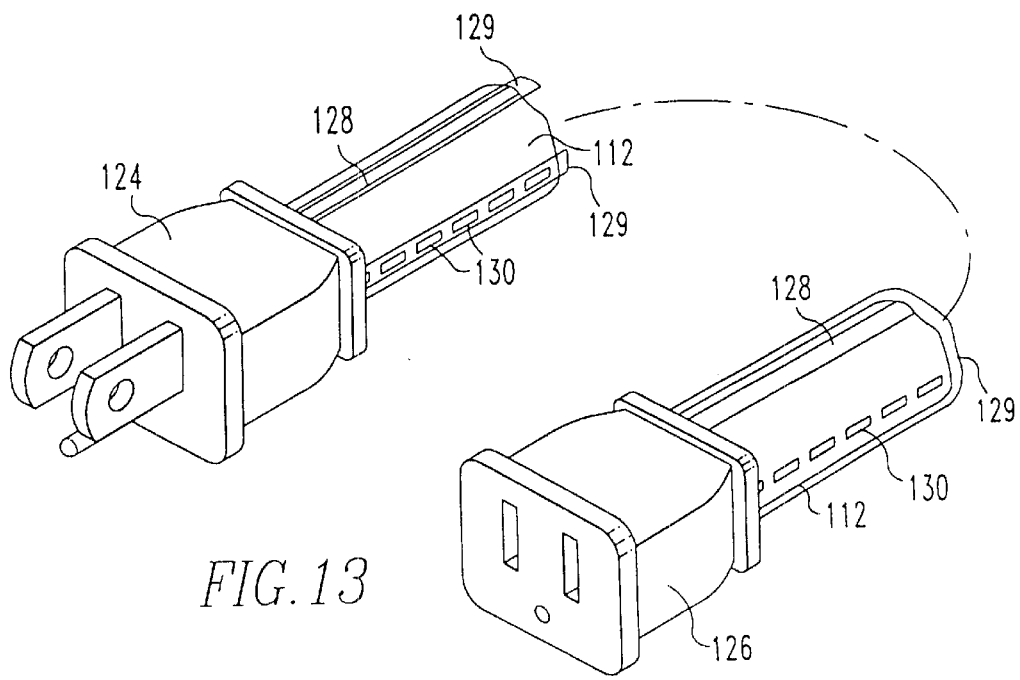
FIG. 13 is a broken of perspective view of an electrical extension cord.

Referring to FIG. 13, the cord section of the extension cord that may include any features of FIGS. 1 through 17 including 17. In FIG. 13 the cord section is at numeral 112, and there is a male plug 124, and at least one female receptacle 126, both 124 and 126 are electrical connective devices. There is a trip of visually reacting material 128. Alternatively the visually reacting material may be at intermittent markings as at 130, and have an optional transparent protective cover 129, the visually reacting material may completely cover plug 124 which is a male end 124, and the female receptacle 126 which is a female end 126 with same optional transparent protective cover 129. Alternately the entire extension cord can have all its' insulating parts thermochromically impregnated.

Figure 14:
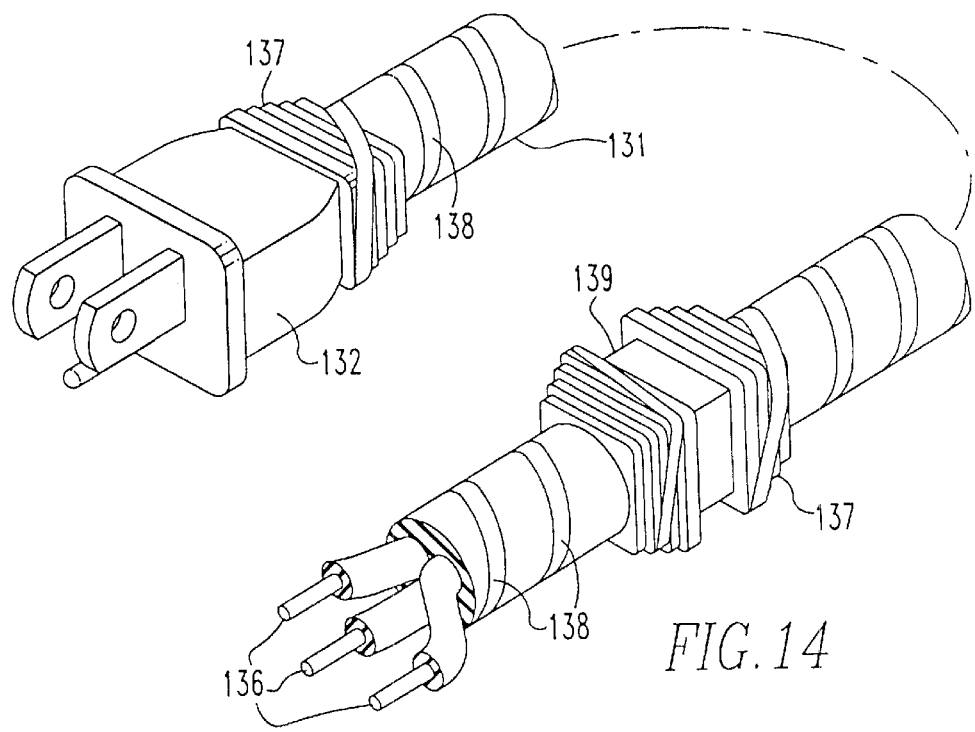
FIG. 14 is a broken of perspective view of an electrical power cord.

Referring to FIG. 14, there is shown a power cord that may include any features of FIGS. 1 through 17 including 17. In FIG. 14 the power cord which has been modified, for example, by use of the tape shown in FIG. 11 in which the cord is shown generally at 131, having an electrical connective devices 132, which is a male end 132 which is a male plug 132, and conductive leads 136, and in which the tape 138 is arranged in a spiral wrapped around pattern wrapping around cable 131. The entire power cord could be made of a thermochromic impregnated insulation, which would include the male end 132, restraining lamp 139, and flexible semi-stiff cable strain relief ribs of 137. Also referring to FIG. 14, a heat shrinkable tape 138 for any electrical cable assembly not of this patent application.

Referring to FIG. 15, there is an electrical cable assembly that may include any features of FIGS. 1 through 17 including 17. In FIG. 15 there is a conductive element 142, surrounded by insulation 144, and an exploded view of a layer of visually reacting material 146 which is covered by a transparent protective cover 148. Visually reacting materials which are sensitive to different temperatures or some physical component of electrical energy whether directly or indirectly, are separated by separations as at 150, so that different sections of different types of visually reacting material will indicate increases or decreased in temperature, or increments of electrical faults, or overload conditions by movement of the visually activated section of the cable. Preferably adjacent sections blending or over-lapping into one another will contain materials which are visually reacting in adjacent temperature ranges, or increments of electrical faults, or over load conditions so that said changes in temperature and so forth will be most likely to give a clear appearance of movement. It will also be seen that the separations between the various visually reacting materials may be arranged transversely as in section 152, these separations may be arranged to give the appearance of bands in/or on the cable jacket and to create the appearance of longitudinal movement. Examples of possible temperature ranges at which materials in these bands would be activated are also shown in section 152. Coatings or layers of different types of visually reacting material or thermochromic ink may also be included in the form of lettering as in section 154 where possible temperature ranges for activation are also shown. Separations may also be arranged longitudinally as is shown in section 156, where possible temperatures changes for activation are also shown to create the appearance of a colored strip having rotational movement around cable or give the illusion of the cable rolling. Finally as is shown in section 158 a background of coating applied with lettering coating may also be established by concentric layers as was shown in FIG. 3 to indicate increments of temperatures or electrical faults, in section 154. Possible ranges for activation of the visually reacting materials in those ranges is also shown at 158. Cable assembly may be designed to have separate features separately, or in some combination. Temperature ranges that are in FIG. 15 are there for example only.

Figure 16:
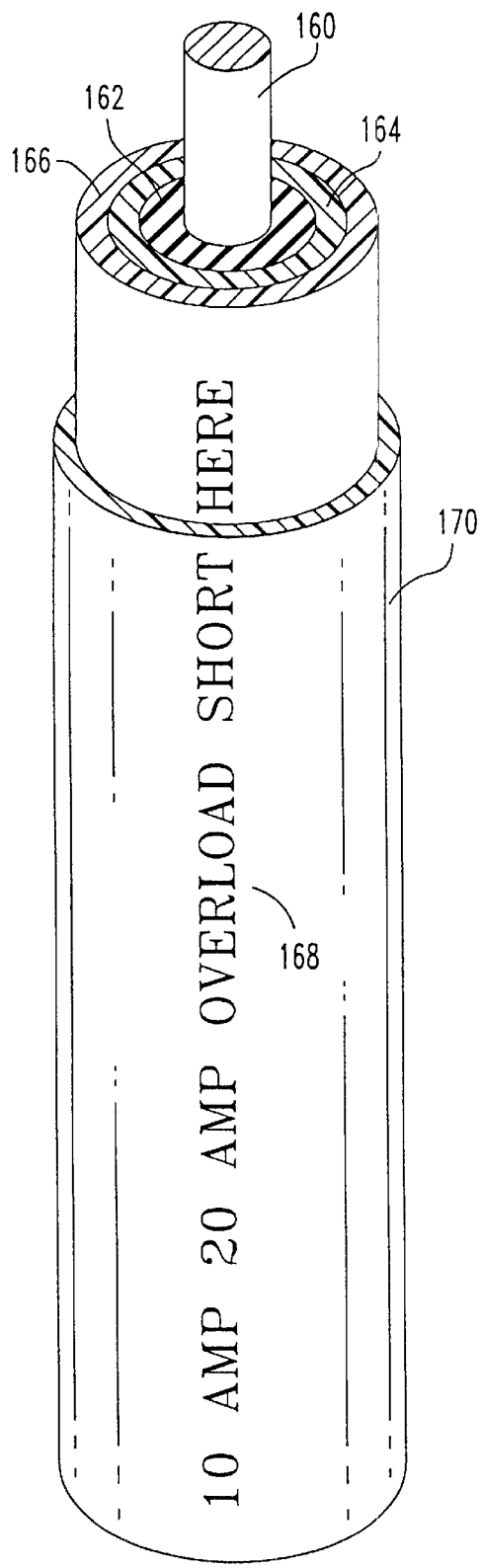
FIG. 16 is a cross-sectional perspective view of an electrical wire or cable.

Referring to FIG. 16, there is an electrical cable assembly that may include any features of FIGS. 1 through 17 including 17. In FIG. 16 there is a conductive medium 160, surrounded by insulation 162, and visually reacting material 164 that may be impregnated into the insulation 162 which is covered by a transparent protective cover 166. On the transparent protective over 116, there is lettering with holographic ink as at 168 which may be a coating thickness layer of visually reacting material which indicates the presence of an electrical malfunction. Over his lettering there is a transparent protective covering of holographic film 170. Also referring to FIG. 16 a conductor 160 surrounded by a principle insulation 162 with a luminescence, or non-changing color and/or descriptive terminology added at 164 and 168 with a thermochromic material that changes from same dark color or opaque at normal electrical conditions, to having transparency during abnormal electrical conditions at 166, which is protected with an optional protective covering at 170.

Figure 17:
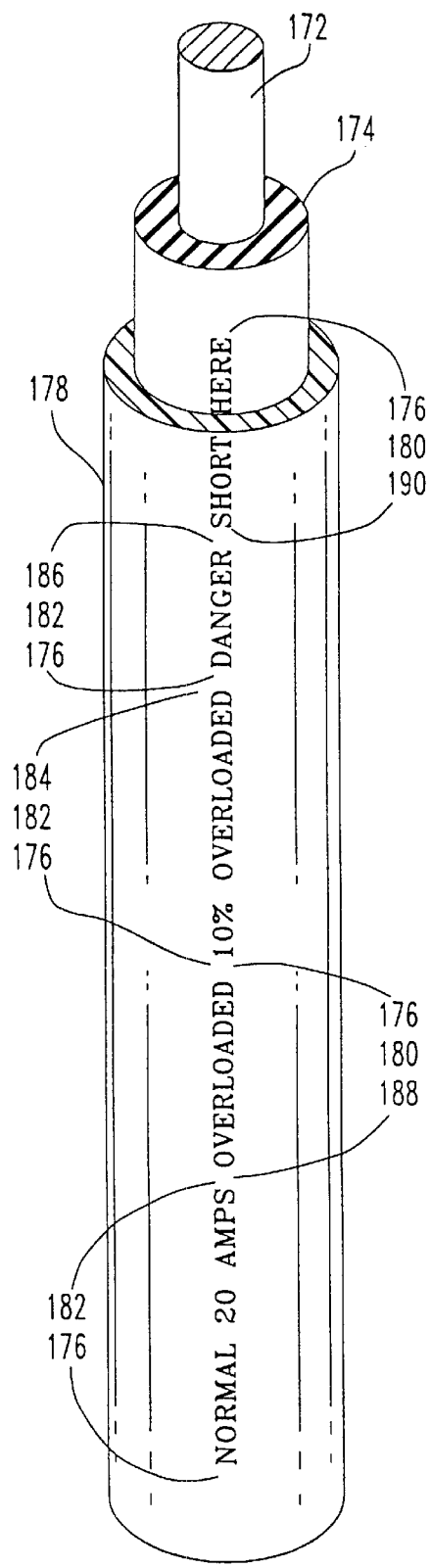
FIG. 17 is a cross-sectional perspective view of an electrical wire or cable.

Referring to FIG. 17, FIG. 17 is an electric cabling assembly that may include any features of FIGS. 1 through 17 including 17. In FIG. 17 there is a conductive medium at 172, surrounded by insulation 174, and visually reacting materials in the form of understandable language 176 which may be visual information or descriptive terminology 176, which is covered by a transparent protective cover 178. On the insulation 174 some of the visually reacting material reacts temporary as at 182, some of the visual reacting material may react permanently as at 188 and 190, because the visually reacting material is the same color as the insulation 174, and if the insulation 174 were a different color, then a drop back would be needed surrounding insulation 174 so as to camouflage, the understandable language 176 this makes a camouflage means, that would be printed on the drop back. The understandable language 176 is not seen, until activation occurs at a predetermined electrical and/or thermal condition, for example the phrase at 184 may appear before 186. The phrases of 188 and 190 could be last to appear if harmful electric condition were not corrected. Likewise, in FIG. 17 the insulation 174 may be impregnated and or covered with a visual reactive material, then an understandable language 176 printed on with normal ink, being both the same color, again phrases would be camouflaged until a predetermined electrical and/or thermal condition was to occur for activation of 176 phrases this also makes a camouflage means. In both processes an optional transparent protective cover could be tinted to aid the visual results. In both processes it may be desirable to employ the use of a visual and/or heat retardant or inhibitor, to be an ingredient in any of the visual reacting material 176 and/or the insulation 174, in order to predetermine the timing or occurrence of the visual activation process, and/or rate of visual activation duration. The mass at a cable assembly would also be another factor. In both processes some of the understandable language 176, may be designed to disappear. An example is the word normal, which may contrast the background at 174 during normal conditions and then camouflage itself into the background or dropback of 174 either temporary and/or permanently at predetermined conditions, in predetermined fashions. In both processes and other Figures of this patent, an artificial background may be needed to cover the outside of insulation 174 to aid visual result, if the insulation is not of a suitable natural color.

Referring to FIGS. 1, 2, 3, 9, 13, 14, 15, 16, 17 some General rules for building reacting insulated electrical cables. If an attention getting material having some response triggered at some predetermined hazard, has a high enough insulating value, the right durability factors, flexibility, and meets all proper electrical or insulating standards. It may be used solely as insulating means coupled directly to a conductor, and should handle without reacting to processes of normal electrical conduction by the conductor. In cases where an attention getting material does not always meet the standards required for an electrical cable assembly, it will then have to be a structure comprisement, or a consistent of a known insulation that does, and will still meet the required standards after that manipulation. Depending on the environmental influences to attention getting material would warrant or not, the use of a protective cover, that would have a means to release the responses of the attention getting material.

Although the invention has been described in a certain amount of detail, it will be understood that this disclosure has been made only as an example and that the scope of the invention is defined by the following claims.

What is claimed is:

1. A hazard self-indicating electrical cable assembly comprising: at least one electrical conducting means; at least one electrical insulating means disposed around said electrical conducting means; and at least one attention getting means to indicate a malfunction in the cable assembly; wherein said at least one attention getting means includes a heat shrinkable material being coupled to said at least one insulating means, and is activable during the malfunction, said heat shrinkable material being adapted to shrink to a degree sufficient to deform the outermost surface of the at least one insulating means.

2. A hazard self-indicating electrical cable assembly comprising: at least one electrical conducting means; at least one electrical insulating means disposed around said electrical conducting means; and at least one attention getting means to indicate a malfunction in the cable assembly wherein said at least one attention getting means is an odoriferous releasing material and is coupled to said at least one insulating means; wherein said odoriferous releasing material releases at least one odor in response to the malfunction in the electric cable assembly.

3. The electric cable assembly of claim 2 further comprising: a protective cover disposed about said insulating means; said protective cover being coupled to said attention getting means, and said protective cover having plurality of openings therein to allow the response of said attention getting means to be released through said protective cover and into the environment surrounding the cable assembly.

4. The electrical cable assembly of claim 2, further comprising:
   at least one cable jacket adapted to be received around said electrical cable assembly; and wherein said
   attention getting means is disposed within said cable jacket.

5. The electric cable assembly of claim 2, wherein the odoriferous releasing material is selected from the group consisting of methyl nonylketone, oil base odor releasing gels, sulfur based compositions and sulfur based compositions that contain chlorides.

6. hazard self-indicating electrical cable assembly comprising: at least one electrical conducting means; at least one electrical insulating means disposed around said electrical conducting means; and an attention getting means which is a taste releasing material and is coupled to said at least one insulating means; wherein said taste releasing material is a non-palatable tasting composition, releasing at least one taste in response to putting said electrical cable assembly in the mouth.

7. The electrical cable assembly of claim 6, wherein the tasting composition is selected from the group consisting of hot pepper extract and citric acid.

8. The electrical cable assembly of claim 6, further comprising a protective cover, wherein said cover includes a plurality of openings that allow the tasting composition to escape from the electric cable assembly into the surrounding environment.

9. The electrical cable assembly of claim 6 further comprising:
   at least one cable jacket adapted to be received around said electrical cable assembly; and wherein said attention getting means is disposed within said cable jacket.

10. The electric cable assembly of claim 6 further comprising: a protective cover disposed about said insulating means; said protective cover being coupled to said attention getting means, and said protective cover having a plurality of openings therein to allow the response of said attention getting means to be released through said protective cover and into the environment surrounding the cable assembly.

11. A hazard self-indicating electrical cable assembly comprising:
   at least one electrical conducting means:
   at least one electrical insulating means disposed around said electrical conducting means; and at least one attention getting means to indicate a malfunction in the cable assembly; wherein said attention getting means is an attention getting material variety which is coupled to said at least one electrical insulating means, said attention getting material being arranged in spaced repeating sets of markings or locations where a set is comprised of multiple markings or locations of attention getting material where each mark or location indicates a different magnitude of the malfunction.

12. The electrical cable assembly of claim 11, the attention getting materials are selected from the group consisting of those which produce a change in color; produce swelling; produce blistering; produce shrinking; produce melting; produce a foul odor; produce a sound and produce a foul taste in the electrical cable assembly.

13. A hazard self-indicating electrical cable assembly comprising:
  at least one electrical conducting means;
  at least one electrical insulating means disposed around said electrical conducting means; and
  at least one attention getting means to indicate a malfunction in the cable assembly; wherein said at least one attention getting means includes a plurality of different attention getting materials, each of said materials reacting in a different neighboring range of hazard; said materials being positioned in neighboring locations coupled to said at least one electrical insulating means and said materials being selected so that adjacent locations will contain materials that are attention getting in increments of hazard so that changes in hazard will give the appearance of movement by the attention getting materials.

14. A hazard self-indicating electrical cable assembly comprising:
  at least one electrical conducting means;
  at least one electrical insulating means disposed around said electrical conducting means;
  at least one attention getting means to indicate a malfunction in the cable assembly and
  at least one camouflage means in cooperative relationship with the at least one insulating means, said at least one camouflage means being adapted to interact with the at least one attention getting means.

15. The electrical cable assembly of claim 14, wherein said camouflage means includes a visually reacting material and said visually reacting material is coupled to a dropback wherein said dropback is an artificial dropback color or the natural background color that is coupled to said electrical insulation.

16. A hazard self-indicating electrical cable assembly comprising:
  at least one electrical conducting means;
  at least one electrical insulating means disposed around said electrical conducting means;
  at least one attention getting means to indicate a malfunction in the cable assembly; said at least one attention getting means including a visually reacting material that includes visual information which may be in the form of some descriptive terminology or alphanumerics; and
  at least one camouflage means: said camouflage means causing the visual information to become temporarily apparent or temporarily vanished, or permanently apparent or permanently vanished, by the visual information contrasting or being the same color as a dropback or as the insulation's natural color or as the color of a protective cover disposed around the cable assembly.

17. The electrical cable assembly of claim 16 wherein said visual information is in the form of some descriptive terminology, that is camouflaged by a dropback or the insulation's natural color or the protective cover said attention getting means being disposed in said dropback & insulation or protective cover and said camouflage means includes a visually reacting formulation, which changes against the visual information causing the descriptive terminology to become temporarily apparent or temporarily vanished, or permanently apparent or permanently vanished.

18. A hazard self-indicating electrical cable assembly comprising:
  at least one electrical conducting means;
  at least one electrical insulating means disposed around said electrical conducting means; and
  at least one attention getting means to indicate a malfunction in the cable assembly; wherein the at least one attention getting means includes a visual reacting material wherein visual reacting material has the display of at least three different primary colors, said primary colors becoming visible or invisible upon activation.

19. A hazard self-indicating electrical cable assembly comprising:
  at least one electrical conducting means;
  at least one electrical insulating means disposed around said electrical conducting means, and
  wherein said electrical cable assembly is camouflaged by a thermochromic material covering so as to change the said electrical cable assembly's appearance for the purpose of attention getting, whereby said thermochromic material changes from opaque to a degree of clarity or from degree of clarity to opaque, said changed thermochromic material exposing a hidden material or hiding a material that underlies the thermochromic material.

20. A hazard self-indicating electrical cable assembly comprising:
  at least one electrical conducting means;
  at least one electrical insulating means disposed around said electrical conducting means, and at least one attention getting means to indicate a malfunction in the cable assembly; wherein said at least one attention getting means is coupled to a textile fabric making an attention getting textile fabric wherein said textile fabric has at least one thread that is coupled to said attention getting means.

21. A hazard self-indicating electrical cable assembly comprising:
  at least one electrical conducting means;
  at least one electrical insulating means disposed around said electrical conducting means;
  a hazard self-indicating cable repair jacket for positioning around said electrical insulating means; wherein said jacket includes an insulated elastic boot to fit around a location on said insulating means in need of repair: and at least one attention getting means coupled to said boot.

22. A hazard self-indicating electrical cable assembly comprising: at least one electrical conducting means; at least one electrical insulating means disposed around said electrical conducting means; a flexible hazard self-indicating or self-locating tape comprising a substrate wherein one side of said substrate includes an adhesive means; and an attention getting means coupled to said substrate.

23. A hazard self-indicating electrical cable assembly comprising:
   at least one electrical conducting means:
   at least one electrical insulating means disposed around said electrical conducting means;
   at least one attention getting means to indicate a malfunction in the cable assembly; and
   a hazard self-indicating electrical conduit; for housing of the electric cable assembly; said conduit having a retaining or guiding flame path comprising:
      a fireproof material;
      a reacting means; coupled to said fireproof material;
      a protective cover coupled to said reacting material said fireproof material having a tubular structure wherein the structure has an inner diameter which is larger than the outer diameter of said electrical cable assembly said cable assembly being protected by said conduit and said conduit can guide flames, that may come from an electrical short in said electric cable assembly said protective cover having means to release responses of said reacting material.

24. A hazard self-indicating electrical cable assembly comprising:
   at least one electrical conducting means;
   at least one electrical insulating means disposed around said electrical conducting means; and
   a hazard self-indicating electric cable replaceable jacket; for positioning around the electrical cable assembly the jacket comprising:
      an electrically insulating shell adapted to fit around the electric cable assembly; wherein the shell includes a slit to receive the electrical cable assembly; and an attention getting means coupled to said shell;
      an optional transparent protective cover coupled to said attention getting means to release responses of said attention getting means to indicate malfunctions in the electrical cable assembly.

* * * * *